No. 12,261 REISSUED AUG. 23, 1904.

W. F. BOSSERT.

FISH PLATE JOINT FOR RAILWAY RAILS.

APPLICATION FILED MAR. 19, 1904.

WITNESSES

Rich. A. George

E. Everett Riley

INVENTOR

WILLIAM F. BOSSERT

BY Riley & Lane

ATTORNEYS.

No. 12,261. Reissued August 23, 1904.

UNITED STATES PATENT OFFICE.

WILLIAM F. BOSSERT, OF UTICA, NEW YORK.

FISH-PLATE JOINT FOR RAILWAY-RAILS.

SPECIFICATION forming part of Reissued Letters Patent No. 12,261, dated August 23, 1904.

Original No. 723,439, dated March 24, 1903. Application for reissue filed March 19, 1904. Serial No. 199,045.

*To all whom it may concern:*

Be it known that I, WILLIAM F. BOSSERT, a citizen of the United States, residing at Utica, in the county of Oneida and State of New York, have invented certain new and useful Improvements in Fish-Plate Joints for Railway-Rails, of which the following is a specification, reference being had therein to the drawings filed with the office in application Serial No. 138,648, filed January 12, 1903, and issued March 24, 1903, being No. 723,439, for a reissue thereof.

The invention about to be described relates to fish-plate joints to support and hold the ends of railway-rails to one another, and provides a new and novel device for the purpose by means of which the rails are held firmly and rigidly.

The joint when in position upon the ends of two abutting rails consists of two similar independent plates, one on each side of the rail, each having an extension from near the center of the rail outward beyond the edge of its foot, where it returns upon itself for a short distance, then rises and conforms to the upper side of the foot and the face of the web and makes a bend outward at the curve on the under side of the rail-tread and returns parallel with at a distance from or spaced from the part near the web and terminating in contact with a portion on the upper side of the foot, leaving a hollow narrow space between the parallel parts of plate near the said web the entire length of the plate, which is filled with a strip of hard wood or other suitable comparatively elastic material. The two plates are secured to each other and the rails by bolts which extend through the parallel walls of the plates and the web of the rail, which are provided and secured with nuts. By the wood or other filling in the said spaces the vibrations of the traffic on the rails are taken up, and the bolt-heads and nuts are provided with cushioned seats and are not readily jarred loose. I provide independent clamps upon each side of the base of the plates, which are connected by bolts and nuts, by means of which the lower parts of the plates are held to the foot of the rail, and notches are made in the sides of the base for the reception of the bolts or spikes.

Figure 1:
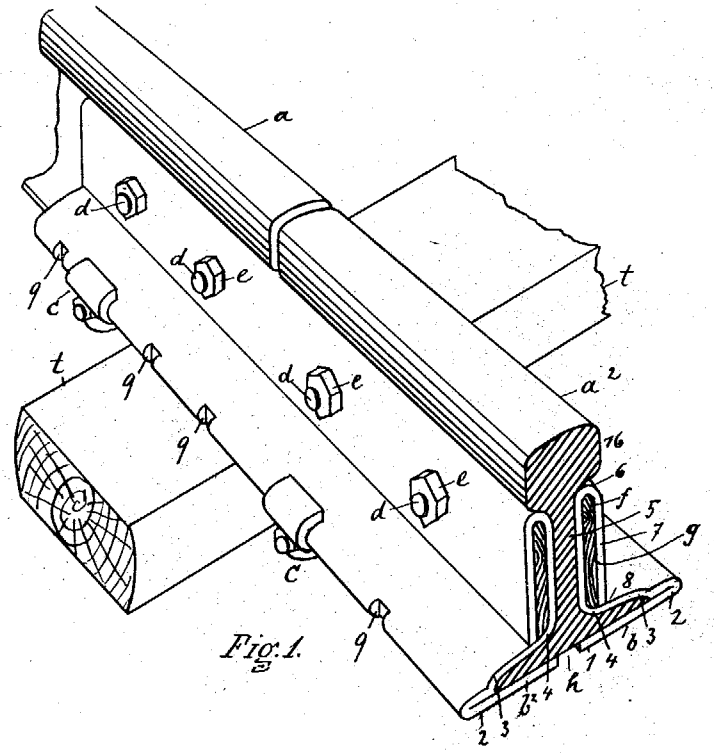
Figure 2:
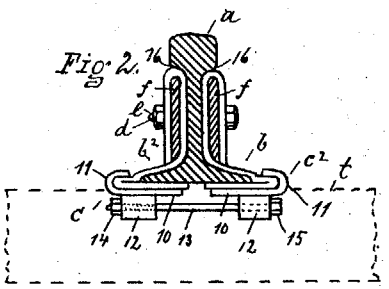

In the drawings which form a part and illustrate the specification, Figure 1 is a perspective view of the fish-plate device secured to and joining the adjacent ends of two rails. Fig. 2 is an end view of the fish-plate joint, the rail being in section.

Referring to the drawings, $a$ $a^2$ represent the ends of two rails, and $b$ $b^2$ are the fish-plates, one on each side of the rails, and are referred to by the same reference letters and numerals. The ends of the plates under the foot of the rails are separated by a space $h$, and each extends, as a flat part 1, to beyond the outer edge of the foot, and the plate is there returned upon itself, as at 2, to the edge of the foot, where it rises at the point 3 and conforms to the inclined surface of the foot and its curve 4 to the web and therealong, as 5, to the curve 16 under the rail-tread, where it forms the curve or half-circle 6, and returns, as 7, parallel with and spaced from the part 5 and the web and abuts at 8 against the portion covering the upper part of the rail. An open space $g$ is thus formed the entire length of the plates $b$ and $b^2$, which is filled by the insertion of a strip of some hard and elastic material $f$, as wood, making a very stiff and rigid bar on each side of the rail. The bolts $d$ $d$ extend through the holes made in the parts 7 and 5, the filling $f$, and the web of the rail, which are held together when the nuts $e$ are screwed on. The wooden strip $f$ tends to absorb the vibrations produced by the wheels of trains, and thereby remove the jar upon the bolts, and at the same time it has a cushion effect upon the same, which also prevents jarring and loosening the nuts. The clamps $c$ $c^2$ are provided to hold the lower parts of the plates $b$ $b^2$ together and consist of the plates 10 10 on the under side of the plates 1 1, whose outer ends curve over the ends 2 of the plates, as 11, to grasp the same. Lugs or ears 12 depend from the plates 10, and a bolt 13 extends through them and has upon its end the nut 14, by means of which the clamps are drawn toward each other and also the extremities 2 2 of the fish-plates. Two or more of these clamps are provided for each fish-plate, as may be needed, two usually being sufficient, and are placed at the same distance from each end, leaving a space near the center for the insertion of a wood cross-tie *t*. Notches *g* are cut in the edges of the plates, into which the tie-bolts or spikes are guided to secure the same to the tie-beams in a manner well understood. It will be seen that the plates *b* can be readily and cheaply made, as the material is all of the same thickness, and the manipulation for bending it into shape is all done by machinery. The parts can be readily applied and removed and are interchangeable and can be set up and removed by ordinary track-layers.

I claim as my invention—

1. The combination of the ends of two railway-rails, with a fish-plate device consisting of two similar metal plates conformed to the under side of the rail-foot, the upper side thereof, the web, and the under side of the rail-tread, then returned parallel with and spaced from the part near the web, and terminating at the portion on the upper side of the foot, the space filled with a strip of hard material possessing comparative elasticity, bolts extending across the under side of the rail-foot and adapted to hold the plates thereto.

2. The combination of the ends of two railway-rails, with a fish-plate device consisting of two similar plates of steel or iron one end of each separated under the rail by a space and each extending outward and then inward, conforming to the upper side of the rail-foot, its web, and the under side of the rail-tread, and returning parallel to the part near the web and a distance therefrom to the portion on the upper side of the foot, providing a stiff hollow bar on each side of the rail filled with wood or other suitable material, bolts extending through the plates and web secured by nuts, with independent clamps extending across the under side of the rail-foot adapted to grasp and hold the plates together.

3. In a railway-rail fish-plate device, two similar metal plates each extending from the under side of the rail-foot to an edge thereof and bent back or returned to the upper side of said foot and continued up the same and along the web to the under side of the rail-tread and conforming to the same, then returning parallel with and spaced from the part near the web and abutting upon the foot part, the said space filled with a strip of wood or other suitable material, bolts and nuts extending through the plates and web, and two or more independent clamps under the plates provided with bolts, adapted to hold the same together.

4. In a railway-rail fish-plate device, two similar metal plates conformed to the under side of the rail-foot, the upper side thereof, the web, and the under side of the rail-tread, then returned parallel with and spaced from the part near the web to the portion on the upper side of the foot, the said space filled with a strip of wood or other suitable material, bolts and nuts for holding the plates and rail together, with independent clamps at the bottom of the plates provided with bolts, adapted to hold the plates together.

5. In a railway-rail fish-plate device, two similarly-constructed metal plates, having return curves in the direction of their length for engaging the under sides of the rail-tread, the lower edges of the plates brought together and constructed to conform to the upper sides of the rail-base adjacent to the vertical web thereof, the walls of each plate being separated from each other between the curve and the lower edges of the plate, and means for securing the plates to the rails at their joints over the tie, substantially as set forth.

6. In a railway-rail fish-plate device, two similarly-constructed metal plates having return curves in the direction of their length for engaging the under sides of the rail-tread, the lower edges of the plates brought together and constructed to conform to the upper sides of the foot of the rail adjacent to the vertical web thereof, the walls of each plate being separated from each other between the curve and the lower edges of the plate, a relatively yielding strip inserted between the walls of the plates, and means for securing the plates to the rails at their joints over the tie, substantially as set forth.

7. In a railway-rail fish-plate device, two similarly-constructed metal plates, each formed from a single piece of metal and each provided with return curves at their upper and lower edges forming walls out of contact with each other, and means for securing the plates to the joints of the rail over the tie, substantially as set forth.

8. In a railway-rail fish-plate device, two similarly-constructed metal plates, each formed from a single piece of metal and each provided with return curves at their upper and lower edges forming walls out of contact with each other, a relatively yielding substance inserted between the walls of the plates, and means for securing the plates to the joints of the rail over the tie, substantially as set forth.

9. The combination of the ends of two railway-rails, with a fish-plate device consisting of two similar metal plates conformed to the under side of the rail-foot, the upper side thereof, the web, and the under side of the rail-tread, then returned parallel with and spaced from the part near the web, and terminating at the portion on the upper side of the foot, the space filled with a strip of hard material possessing comparative elasticity, with bolts extending through the plates and web secured by nuts.

10. The combination of the ends of two railway-rails, with a fish-plate device consisting of two similar plates of steel or iron, separated under the rail by a space and each extending outward and then inward, conforming to the upper side of the rail-foot, its web, and the under side of the rail-tread, and returning parallel to the part near the web and at a distance therefrom to the portion on the upper side of the foot, providing a stiff hollow bar on each side of the rail filled with hard material possessing comparative elasticity; with bolts extending through the plates and web secured by nuts.

11. In a railway-rail fish-plate device, two similar metal plates each extending from the under side of the rail-foot to an edge thereof and bent back or returned to the upper side of said foot and continued up the same and along the web to the under side of the rail-tread and conforming to the same, then returning parallel with and spaced from the part near the web and abutting upon the foot part, the said space filled with a strip of suitable hard elastic material, with bolts and nuts extending through the plates and web.

In testimony whereof I have signed my name to this specification, in the presence of two subscribing witnesses, this 6th day of January, 1904.

WILLIAM F. BOSSERT.

Witnesses:
E. EVERETT RISLEY,
E. T. DE GIORGI.